United States Patent
Xie

(10) Patent No.: US 9,222,575 B2
(45) Date of Patent: Dec. 29, 2015

(54) ELECTRIC PUMP

(75) Inventor: Zhe Xie, Rochester, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 861 days.

(21) Appl. No.: 13/286,912

(22) Filed: Nov. 1, 2011

(65) Prior Publication Data

US 2012/0159939 A1   Jun. 28, 2012

Related U.S. Application Data

(60) Provisional application No. 61/426,244, filed on Dec. 22, 2010.

(51) Int. Cl.
*F16D 31/02* (2006.01)
*F16H 61/00* (2006.01)

(52) U.S. Cl.
CPC .................................. *F16H 61/0025* (2013.01)

(58) Field of Classification Search
CPC .... E02F 9/2235; F15B 11/165; F16H 61/421; F16H 61/431
USPC .......................................... 60/368; 417/44.11
See application file for complete search history.

(56) References Cited

U.S. PATENT DOCUMENTS

| | | | |
|---|---|---|---|
| 7,695,250 B2 | 4/2010 | Johnson et al. | |
| 2009/0104044 A1* | 4/2009 | Koehl | 417/53 |
| 2009/0139800 A1 | 6/2009 | Rhein et al. | |
| 2009/0192685 A1 | 7/2009 | Sime | |
| 2009/0241535 A1 | 10/2009 | Schultz et al. | |
| 2010/0021313 A1 | 1/2010 | Devan et al. | |
| 2010/0071357 A1 | 3/2010 | Lundberg et al. | |
| 2010/0216594 A1 | 8/2010 | Hendrickson et al. | |
| 2010/0288570 A1 | 11/2010 | Tarnowsky et al. | |

FOREIGN PATENT DOCUMENTS

| | | | |
|---|---|---|---|
| CN | 101086232 A | 12/2007 | |
| EP | 0574623 A1 * | 12/1993 | F04B 49/06 |

* cited by examiner

*Primary Examiner* — Edward Look
*Assistant Examiner* — Jason Mikus

(57) ABSTRACT

A system for lubricating transmission components with hydraulic fluid includes a pump and a motor coupled to the pump. The pump has an inlet port that receives hydraulic fluid and an outlet port from which hydraulic fluid is pumped to the transmission components. A pump pressure is regulated by adjusting a motor torque of the motor, and the motor torque is set by commands based on a look-up table or a formula.

12 Claims, 2 Drawing Sheets

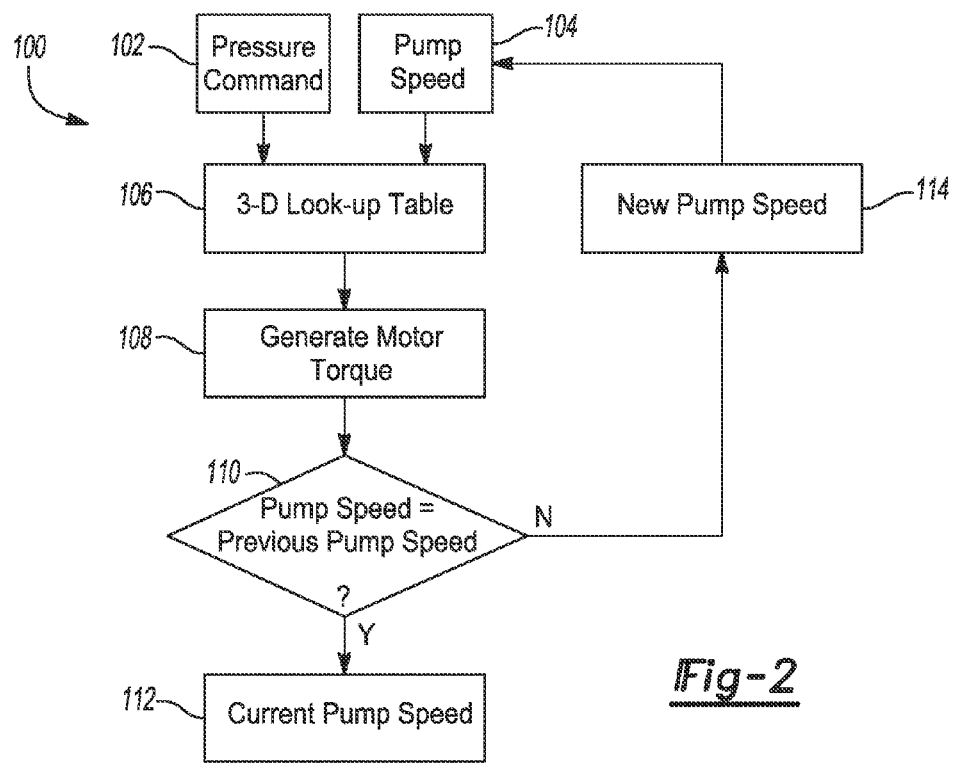
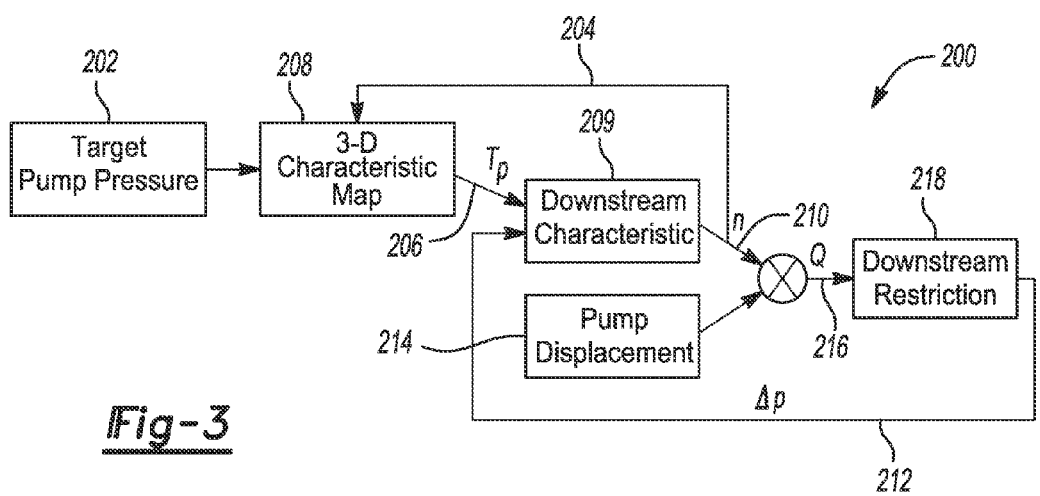

ELECTRIC PUMP

RELATED APPLICATION

This application claims the benefit of U.S. Provisional Application No. 61/426,244, filed Dec. 22, 2010, which is incorporated herein by reference in its entirety.

TECHNICAL FIELD

The present invention relates to an electric pump. More specifically, the present invention relates to a system and method of controlling an electric pump with direct pressure regulation by direct motor torque control.

BACKGROUND

A typical automatic transmission includes a hydraulic control system that, among other functions, is employed to actuate a plurality of torque transmitting devices. These torque transmitting devices may be, for example, friction clutches and brakes. The conventional hydraulic control system typically includes a pump that provides a pressurized fluid, such as oil, to a plurality of valves and solenoids within a valve body. The pump is typically driven by the engine during operation of the powertrain.

However, in the case of hybrid powertrains using a combination of the internal combustion (IC) engine and electric propulsion motor powertrains, the engine has periods of shutdown in order to conserve fuel. As a result, during this time of passive engine operation the main transmission pump stops pressurizing the hydraulic fluid in the transmission or hybrid transmission. However, the components within the transmission must still receive a flow of pressurized hydraulic fluid in order to maintain operability. Current hybrid systems use a motor driven auxiliary pump to deliver a pressurized hydraulic fluid flow to these components, such as the range clutches, in order to keep these components engaged so that the transmission is ready to respond. However, these conventional auxiliary pump systems that are driven by an electric motor may suffer from low system efficiency, may be large in size, and can be expensive.

Accordingly, there is a need in the art for an auxiliary pump system for use in hybrid powertrains that increases efficiency, thereby leading to better fuel economy and allowing for longer engine passive time periods.

SUMMARY

In an aspect of the present invention, a system for lubricating transmission components with hydraulic fluid includes a pump and a motor coupled to the pump. The pump has an inlet port that receives hydraulic fluid and an outlet port from which hydraulic fluid is pumped to the transmission components. A pump pressure is regulated by adjusting a motor torque of the motor, and the motor torque is set by commands based on a look-up table or formula.

Some embodiments may have one of more of the following advantages. The system can deliver the appropriate pressure to a clutch while minimizing hydraulic energy loss. The system may also provide a smooth startup for an auxiliary pump, and, hence, may avoid pump stalls when the auxiliary pump starts with a high pressure.

Further features, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, like reference characters designate corresponding parts throughout the different views. In the drawings:

FIG. 2 is a flow diagram illustrating a method of operation of the pump system in accordance with the principles of the invention; and FIG. 3 is a block diagram of system model for controlling the pump system.

DESCRIPTION

Figure 1:
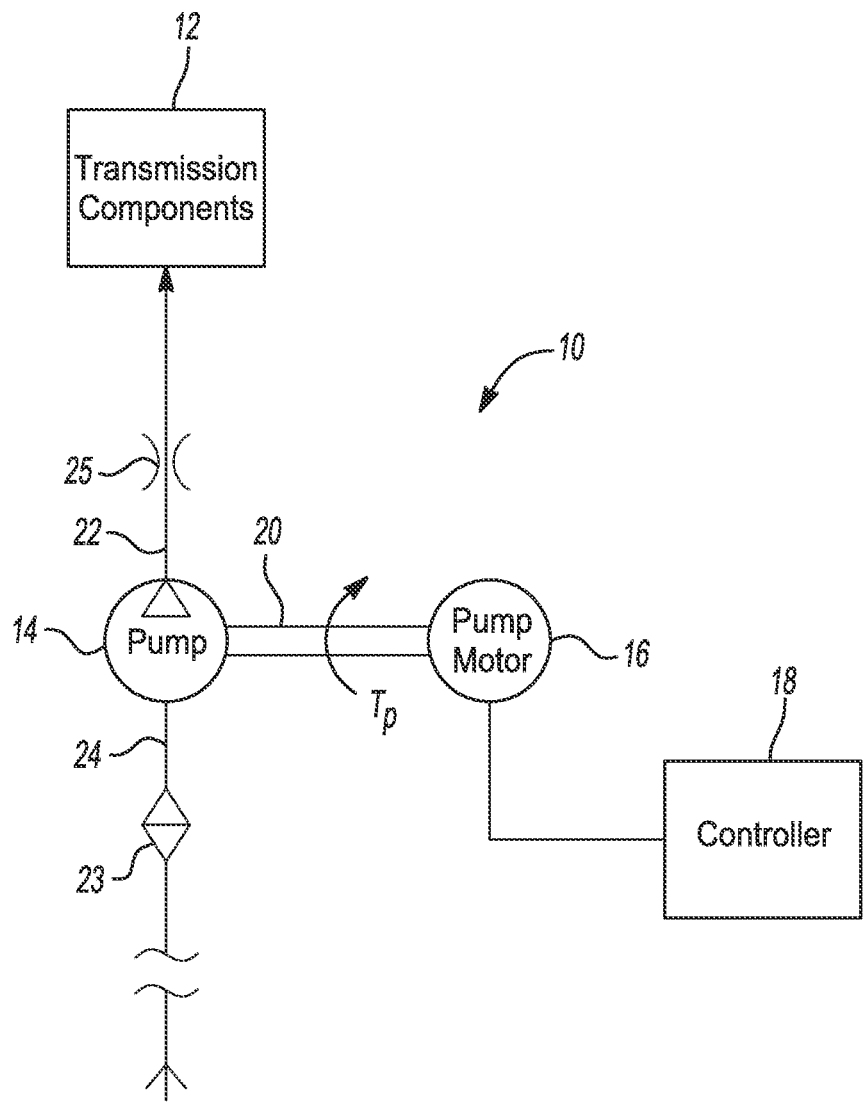
FIG. 1 is a diagrammatic view of an embodiment of a pump system in accordance with the principles of the invention.

With reference to FIG. 1, a pump system for use in a transmission in a motor vehicle is illustrated and generally designated by the reference number 10 wherein the arrows indicate the direction of preferred fluid flow. The hydraulic control system 10 is preferably employed in a hybrid powertrain in a motor vehicle. However, it should be appreciated that the pump system 10 may be employed in any type of powertrain without departing from the scope of the present invention. The pump system 10 is operable to provide a flow of pressurized hydraulic fluid, such as oil, to a plurality of transmission systems or components 12. The transmission components 12 may include various devices or parts that may require fluid flow for hydraulic control functions, lubrications, or cooling, such as, for example, rotatable shafts, gearing arrangements, and/or torque transmitting devices.

The pump system 10 generally includes a hydraulic pump 14, a pump motor 16 coupled to the pump 14 with, for example, a shaft 20, and a controller 18 that commands the operation of the pump 14 and the pump motor 16.

The pump 14 generally includes an outlet port 22 from which hydraulic fluid is transmitted to the transmission components 12 and an inlet port 24 through which the pump receives hydraulic fluid. The pump may be a crescent pump, an impeller pump, a gear pump, or a vane pump without departing from the scope of the present invention. The system 10 may further include a fluid conditioner, such as, for example, a filter 23 that removes contaminants from the fluid before entering into the inlet port 24 and may include a flow restrictor 25 placed between the outlet port 22 and the transmission components 12.

In a particular arrangement, the pump 14 is a fixed displacement pump driven by the motor 16. The motor rotor can drive the pump 14 through the shaft 20, or the rotor may be a part of the pump 14 itself. In either case, the effective pump torque $T_p$ is equal to the electric motor electromagnetic torque minus any mechanical loss such as bearing friction torque. Since the mechanical loss can be calibrated at the motor manufacturer, the relationship between the electromagnetic torque and the effective pump torque is known, that is, $T_p$ vs. $T_m$. On the other hand, the relationship between the pump speed and motor speed is either 1:1 or some other given number based on the gear ratio between them. Depending on the type of electric motor 16, the pump torque $T_p$ can be regulated either directly as in a DC motor, or indirectly through vector control as in an AC motor.

Turning now to FIG. 2, there is a shown process 100 for operating the pump system 10, and, in particular, the pump 14. A corresponding block diagram for a system model 200 is shown in FIG. 3. The process 100 commands the torque of the motor 16 rather than its speed. The motor electromagnetic torque is a function of the motor current or a component of the motor current. As such, the motor torque can be directly controlled by a motor controller. The process 100 calculates the torque command from the line pressure requirement and motor speed feedback, while considering the characteristics of the pump according to the relationship:

$$T_p = \frac{\Delta p D}{2\pi} + C_d D \mu n + C_f \frac{D}{2\pi} \Delta p + T_c \qquad \text{Eqn. 1}$$

where:
$T_p$=pump torque (in units for torque)
$T_c$=constant frictional torque (in units for torque)
$C_d$=coefficient of viscous drag
$C_f$=coefficient of friction
D=pump displacement (volume/rev)
μ=fluid viscosity (in units for viscosity)
Δp=pump pressure rise (in units from pressure)
n=pump speed (rev/sec)

Based on the pump performance model described above, for a particular pump, D, $C_d$, $C_f$, and $T_c$ are known, and for a particular fluid the pump is working with, μ is known. All of these coefficients may be temperature dependent (because of thermal expansion of the solid components and parts, viscosity change of fluid, and friction variation of contact surfaces), but the variation with temperature can be either modeled or mapped by bench tests. As a result, a 3-D look up table or a formula for the three operational parameters pump torque ($T_p$), pressure rise (Δp), and pump speed (n) are part of the pump hardware characteristic and can be measured through a pump final bench test. An example of the look-up table format is shown below:

| Pump Speed, n | Pump Torque, $T_p$ (Nm) Pressure Difference, Δp (kPa) | | | | | | | | | |
|---|---|---|---|---|---|---|---|---|---|---|
| (RPM) | 100 | 200 | 300 | 400 | 500 | 600 | 700 | 800 | 900 | 1000 |
| 500 | 0.2 | 0.23 | 0.3 | 0.56 | 0.78 | 0.81 | 0.89 | 0.95 | 1.02 | 1.36 |
| 1000 | 0.36 | 0.5 | 0.68 | 0.82 | 1.04 | 1.28 | 1.56 | 1.74 | 2.2 | 2.41 |
| 1500 | 0.54 | 0.72 | 0.9 | 1.1 | 1.32 | 1.54 | 1.86 | 2.14 | 2.46 | 2.82 |
| 2000 | 0.84 | 1.08 | 1.34 | 1.58 | 1.86 | 2.2 | 2.46 | 2.92 | 3.34 | 3.72 |
| 2500 | 1.26 | 1.52 | 1.82 | 2.14 | 2.52 | 2.88 | 3.2 | 3.58 | 4.04 | 4.58 |
| 3000 | 1.8 | 2.12 | 2.48 | 2.84 | 3.34 | 3.62 | 4.1 | 4.46 | 5.12 | 5.76 |

A series of 3-D look up tables can be built at different operating temperatures to capture the variation of pump characteristics due to temperature variations. With these 3-D look up tables, at any temperature, if $T_p$ and n are known, Δp can be calculated by an expression resulting from a rearrangement of Eqn. 1:

$$\Delta p = \frac{T_p - T_c - C_d D \mu n}{1 + C_f} \cdot \frac{2\pi}{D} \qquad \text{Eqn. 2}$$

which shows that the pump torque, $T_p$, as a direct relationship with the pump pressure rise, Δp, and the pump speed, n.

Hence, for a given pump design, Δp can be regulated by $T_p$ and n.

In accordance with principles of the present invention, the motor torque versus current relationship is coupled with the pump characteristic among $T_p$, Δp, n. In the case of an automatic transmission pump or other similar applications, the pump delivers a certain line pressure. The actual flow rate demand is a function of the pump downstream restriction, which can vary with the downstream flow actuator status, temperature, and fluid volume, etc. Therefore, the pump 14 sets the target pressure, and the pump speed is adjusted for downstream flow demand.

Unlike conventional techniques that control the pump speed, which would require additional downstream pressure regulators or downstream restriction models to modulate the pressure to the target level, the process 100 regulates the pump in a more simplistic and more efficient way. Accordingly, in initial steps 102 and 104, the process 100 receives a target pressure command and the pump speed, respectively. In a step 106, the process 100 employs the pressure command (step 102) and the pump speed (step 104) information in a pump 3-D lookup table and generates a motor torque command in a step 108.

The process 100 sends the motor torque command from the step 108 to the pump. Along with the pump and downstream system characteristics, the torque determines the pump speed. Then, in the measurement step 110, the pump speed is compared with previous pump speed. If the answer from the step 110 is yes, the process 100 maintains the current pump pressure in a step 112. If the answer from the step 110 is no, the new pump speed 114 is fed back into the process through the step 104, and the torque command will be adjusted in the step 108.

The system block diagram 200 in FIG. 3 illustrates how the pump control process 100 interacts with the downstream hydraulic system. With the target pump pressure 202 and current pump speed 204 provided as inputs, the pump torque command 206 is generated based on the pump 3-D characteristic map 208. With the input of the torque command 206 and the actual pump pressure 212, the pump and downstream characteristic 209 determines the pump speed 210 and the pump displacement 214 determines the actual flow rate 216 out of the pump 14. Accordingly, the pump 14 interacts with the downstream system, since the pump pressure is the result of a downstream restriction 218, which can be described as flow rate versus pressure drop curves that vary with the system operational state. If the downstream restriction curve 218 changes due to the switch between different operational states, the pump pressure feedback changes as a result, which changes the pump speed and, hence, affects the pump torque command. Therefore, the system 10 is essentially a closedloop control system that maintains the target pump pressure with the feedback from both the pressure and pump speed. The only state variable observed using a sensor is the pump speed, which is always available since the motor speed is known. Therefore, pump pressure feedback is directly acting upon the pump characteristic map without a need for a pressure sensor.

The description of the invention is merely exemplary in nature and variations that do not depart from the general essence of the invention are intended to be within the scope of the invention. Such variations are not to be regarded as a departure from the spirit and scope of the invention.

What is claimed is:

1. A system for lubricating transmission components with hydraulic fluid comprising:
   a pump with an inlet port that receives hydraulic fluid and an outlet port from which hydraulic fluid is pumped to the transmission components; and
   a motor coupled to the pump, a controller that commands the operation of said pump and said motor, operation of said controller including a target pump pressure of the pump being regulated by a command motor torque, and the command motor torque being set by varying a pump speed determined from one of a series of 3-D look-up tables that characterizes the pump pressure, the command motor torque, and the pump speed as a function of temperature;
   wherein a flow rate of the hydraulic fluid is based on the pump speed and a pump displacement, the pump pressure being determined from the flow rate and without the use of a pressure sensor, and wherein the pump pressure is provided as feedback to determine a desired pump speed.

2. The system of claim 1 wherein the pump speed is provided as feedback to determine a desired pump torque.

3. The system of claim 1 wherein the motor is coupled to the pump with a shaft.

4. The system of claim 1 wherein the motor includes a rotor that is an integrated component of the pump.

5. The system of claim 1 wherein the pump pressure is determined by the relationship $$\Delta p = \frac{T_p - T_c - C_d D \mu n}{1 + C_f} \cdot \frac{2\pi}{D}$$

where
$T_p$=pump torque
$T_c$=constant frictional torque
$C_d$=coefficient of viscous drag
$C_f$=coefficient of friction
D=pump displacement
µ=fluid viscosity
$\Delta p$=pump pressure rise
n=pump speed.

6. A method for providing hydraulic fluid to components of a transmission, the method comprising:
   a first step of regulating a pressure in a pump, the pump being in communication with the components to pump the hydraulic fluid to the components;
   a second step of adjusting a torque of a motor coupled to the pump to regulate the pump pressure, wherein the motor torque is set by commands based on a look-up table; wherein inputs to the look-up table are a pump speed and a target pressure and
   a third step of adjusting the torque of the motor by a controller, wherein the torque is set by commands based on a formula wherein a flow rate of the hydraulic fluid is based on the pump speed and a pump displacement, the pump pressure being determined from the flow rate and without the use of a pressure sensor, and wherein the pump pressure is provided as feedback to determine a desired pump speed.

7. The method of claim 6 further comprising a fourth step of deciding whether to maintain a pump speed with the current torque level.

8. The method of claim 7 further comprising a fifth step of adjusting the pump speed.

9. The method of claim 8 wherein the pump pressure is provided as feedback and together with the torque command to adjust the pump speed.

10. The method of claim 8 wherein the pump speed is provided as feedback to the look-up table to adjust the pump torque.

11. The method of claim 8 wherein the pump speed is provided as feedback to the formula to adjust the pump torque.

12. The method of claim 6 wherein the pump pressure is determined by the relationship $$\Delta p = \frac{T_p - T_c - C_d D \mu n}{1 + C_f} \cdot \frac{2\pi}{D}$$

where
$T_p$=pump torque
$T_c$=constant frictional torque
$C_d$=coefficient of viscous drag
$C_f$=coefficient of friction
D=pump displacement
µ=fluid viscosity
$\Delta p$=pump pressure rise
n=pump speed.

* * * * *